(No Model.)

C. G. CROSSE.
CAR COUPLING.

No. 376,237. Patented Jan. 10, 1888.

WITNESSES:

INVENTOR:
C. G. Crosse
BY
ATTORNEYS.

UNITED STATES PATENT OFFICE.

CHARLES G. CROSSE, OF SUN PRAIRIE, WISCONSIN.

CAR-COUPLING.

SPECIFICATION forming part of Letters Patent No. 376,237, dated January 10, 1888.

Application filed November 5, 1887. Serial No. 254,362. (No model.)

*To all whom it may concern:*

Be it known that I, CHARLES G. CROSSE, of Sun Prairie, in the county of Dane and State of Wisconsin, have invented a new and Improved Automatic Coupling, of which the following is a full, clear, and exact description.

This invention relates to couplings for vehicles, and has for its object to provide a coupling which will be automatically coupled, and which is uncoupled by means of a suitable mechanism connected therewith.

The invention consists in a coupling provided with a coupling-hook which is automatically thrown into engagement with a link or bar brought to bear against it, and which is uncoupled therefrom by means of a mechanism connected to said hook and extending to the car, from which it may be operated, all constructed and arranged as hereinafter described and claimed.

Reference is to be had to the accompanying drawings, forming a part of this specification, in which similar figures of reference indicate corresponding parts in both views.

Figure 1:
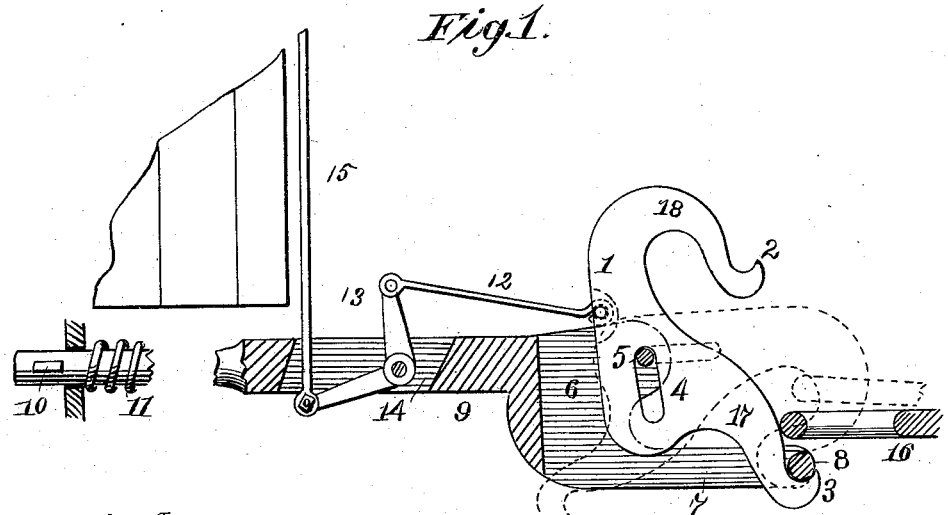
Figure 4:
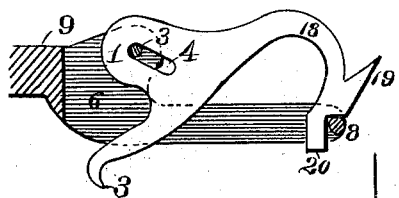
Figure 2:
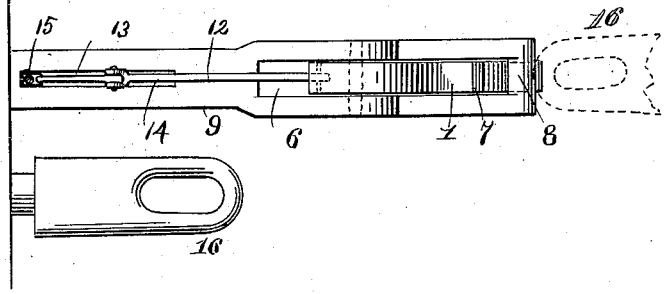
Figure 3:
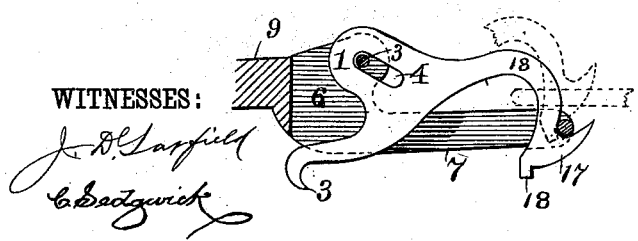

Figure 1 represents my device in position to be coupled, with the draw bar and head in vertical section and broken away; and Fig. 2 is a plan view of the coupler. Fig. 3 shows a modification in the form of the hook, and Fig. 4 represents another modification.

The coupling hereinafter described may be used with a railway-car or with a carriage to couple a pole or shafts. For the sake of illustration, it is shown as applied to a railway-car.

In the construction of my device I employ a hook, 1, provided with the hooked ends 2 3 and having a slot, 4, engaging a pin, 5, mounted in a slot, 6, in the draw-head 7. The latter is formed with a stop or cross-bar, 8, with which the hooked ends 2 3 are adapted to engage. The draw-bar 9 is connected with a car or engine in any suitable way, and, as shown, is connected to a car by means of a pin or bolt, 10, mounted in a slot in the draw-bar and provided with a spring, 11, which permits the draw-bar to yield. To the hook 1 is pivoted a rod, 12, connected with the bell-crank lever 13, pivoted in a slot, 14, in the draw-bar and provided with an operating-rod, 15, extending to the platform of the car, so as to be conveniently operated. The latter mechanism constitutes a means for releasing the hook 1 from engagement with the link or bar with which it is coupled.

Referring to Fig. 1, the hook 1 is shown in normal position to be automatically coupled with a link or pin. To indicate the manner of coupling my device, I have shown a link, 16, mounted on a car or engine, which is adapted to bear against the lower arm, 17, of the hook 1, and which engages with the curved portion 18 thereof when the hook is coupled therewith.

The operation of my device is as follows: The hook 1 being in normal position, as shown in Fig. 1, the link 16, bearing against the arm 17, pushes it back and rotates the hook 1 on the pivot 5, so as to bring the curved portion 18 into engagement with the link 16, as shown in dotted lines, Fig. 1. The hooked end 2 will then have been brought into the slot 6 of the draw-head 7, and upon the link 16 being drawn toward the curved portion 18, and engaging therewith, the hook 1 is drawn forward, sliding on the pin 5, and its hooked end 2 will be drawn into engagement with the stop or cross-pin 8, and thereby serve to re-enforce the hook 1 and lock it in position.

In order to uncouple my device, the link 16 having been moved forward a little way from contact with the curved portion 18, the rod 15 is pushed down, and, operating upon the bell-crank lever 13 and connecting-rod 12, the hooked end 2 is released from the cross-pin 8, and the hook 1 is thrown up in vertical position on the pin 5, its hooked end 3 engaging with the cross-pin 8 and preventing it from further vertical movement.

It will thus be seen that the coupler is automatically coupled, and only needs to be uncoupled by means of a mechanism extending to a convenient position on the car. It will readily be seen that the device above described may be attached to a carriage and the hook be operated in the same way with a link or eye-bar on a pole or shafts.

In the modification in Fig. 3 the hook 1 has its hooked end 2 formed with an extended rounded or beveled portion, 17, having a shoulder or projection, 18. It is sometimes the case that the hook 1 is not in normal position to be coupled, as shown in Fig. 1, but has moved into the position shown in dotted lines in Fig. 3. With the modified construction, instead of being obliged to draw the hook 1 into normal position, as in Fig. 1, the hook 1 will automatically couple with link 16 by the latter bearing against portion 17 and pushing back the hook 1. This action raises the latter, so that link 16 will pass projection 17 and engage curved portion 18.

In modification in Fig. 4 one end of hook 1 is formed with inclined or beveled portion 19 and extension 20. By means of this construction, when the hook 1 is not in normal position, but has assumed a position so that links 16 will bear against inclined part 19, the links 16 will slide past projection 20 and engage the curved portion 18, and projection 20 will engage stop 8.

While I have shown and described a particular mechanism for uncoupling the hook, I do not desire to limit myself thereto, as any suitable means may be employed to accomplish the same result.

Having thus fully described my invention, what I claim as new, and desire to secure by Letters Patent, is—

1. An automatic coupling consisting of a sliding pivoted hook having hooked ends and a beveled portion between the hooked ends adapted to be acted upon by a link, a slotted draw-head having a stop with which the hooked ends are brought into engagement, and mechanism, substantially as described, to release the hook, as shown and described.

2. In an automatic coupling, the combination, with a sliding pivoted hook having hooked ends and a beveled portion between the hooked ends adapted to be acted upon by a link, of a slotted draw-head having a stop on a plane below the engaging-link, with which either hooked end may be brought into engagement, substantially as described.

3. An automatic coupling consisting of a slotted draw-head, 7, a pivoted hook, 1, having extended portion 17, projection 18, and slot 4, and mounted on the pin 5, stop 8, rod 12, bell-crank lever 13, and operating-rod 15, substantially as described.

4. In an automatic coupling, a slotted draw-head provided with a sliding pivoted hook having hooked ends, one of the hooked ends being formed with an extended beveled bearing and a projection, and the draw-head having a stop with which the hooked ends are adapted to engage, substantially as described.

CHARLES G. CROSSE.

Witnesses:
 CHAS. S. CROSSE,
 WALTER S. HIDDEN.